(No Model.) 2 Sheets—Sheet 1.

E. H. C. OEHLMANN.
AUTOMATIC REGULATOR FOR VALVES, &c.

No. 515,787. Patented Mar. 6, 1894.

Inventor:
Emil Heinrich Conrad Oehlmann

Witnesses
E. B. Bolton
H. van Oldenneel

By Reuwards
his Attorneys.

(No Model.) 2 Sheets—Sheet 2.
E. H. C. OEHLMANN.
AUTOMATIC REGULATOR FOR VALVES, &c.
No. 515,787. Patented Mar. 6, 1894.
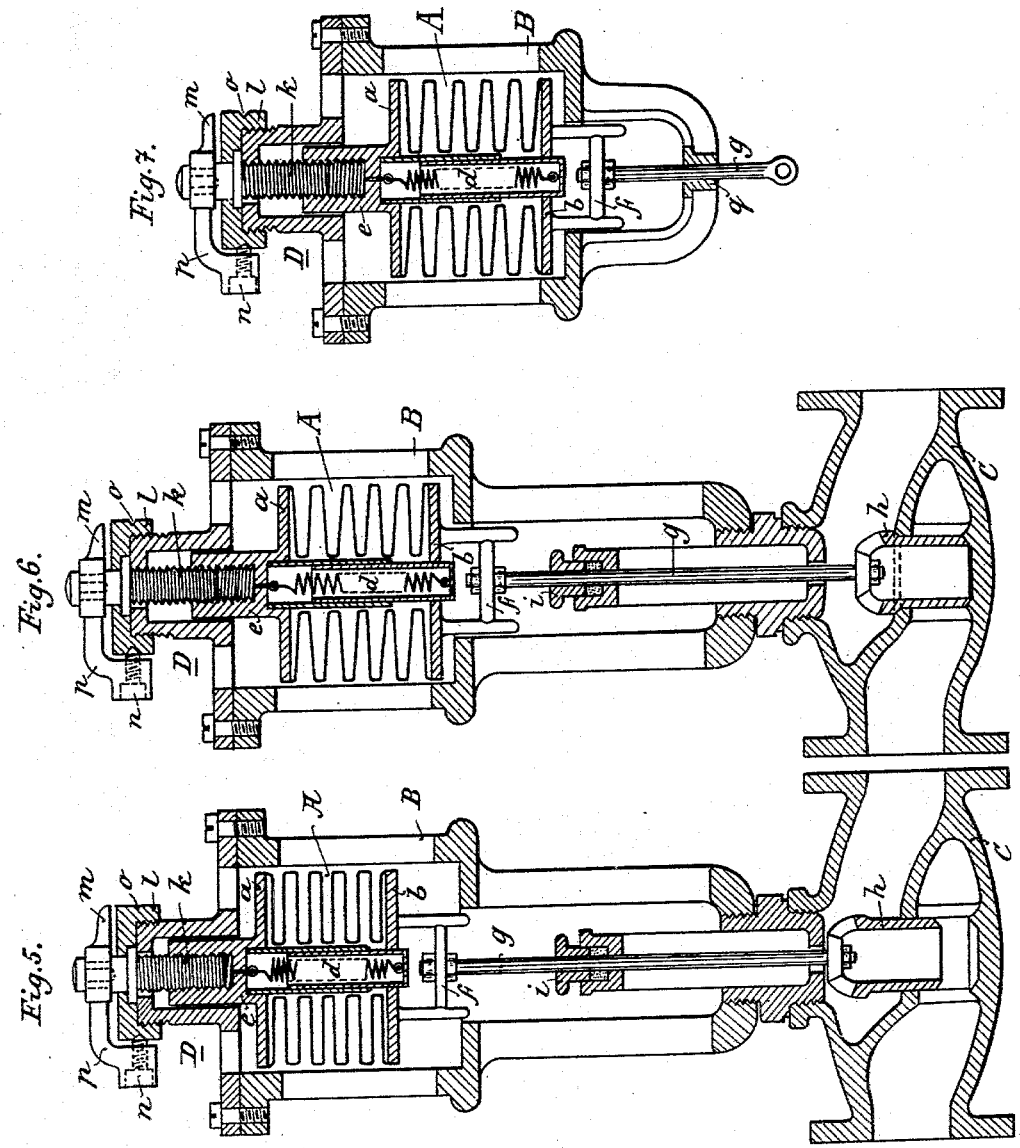
Witnesses:
E. B. Bolton
H. van Oldenneel
Inventor
Emil Heinrich Conrad Oehlmann
By
his Attorneys.
THE NATIONAL LITHOGRAPHING COMPANY,
WASHINGTON, D. C.

UNITED STATES PATENT OFFICE.

EMIL HEINRICH CONRAD OEHLMANN, OF BERLIN, GERMANY.

AUTOMATIC REGULATOR FOR VALVES, &c.

SPECIFICATION forming part of Letters Patent No. 515,787, dated March 6, 1894.

Application filed June 1, 1893. Serial No. 476,262. (No model.)

*To all whom it may concern:*

Be it known that I, EMIL HEINRICH CONRAD OEHLMANN, engineer, a subject of the King of Prussia, German Empire, residing at the city of Berlin, in the Kingdom of Prussia, Germany, have invented certain new and useful Improvements in Automatic Regulators for Valves and the Like, of which the following is a specification.

My invention has for its object to prevent the variation of temperature in rooms and the like and it includes a special arrangement of expanding and contracting cell connected with a valve or other regulator.

The invention can be arranged to act and close the valve either by expanding due to a rise in the temperature or by contracting due to a fall in the temperature.

Figure 1:
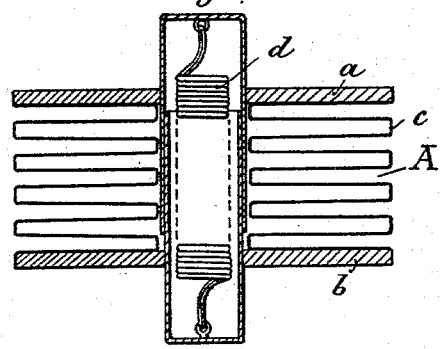
Figure 2:
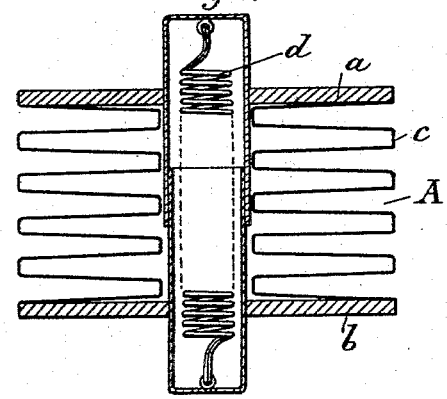
Figure 3:
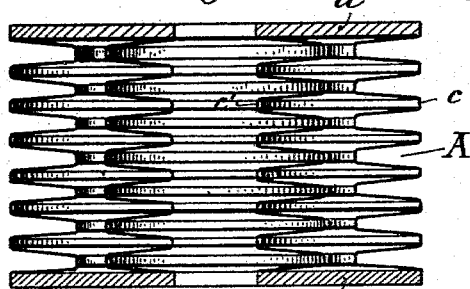
Figure 4:
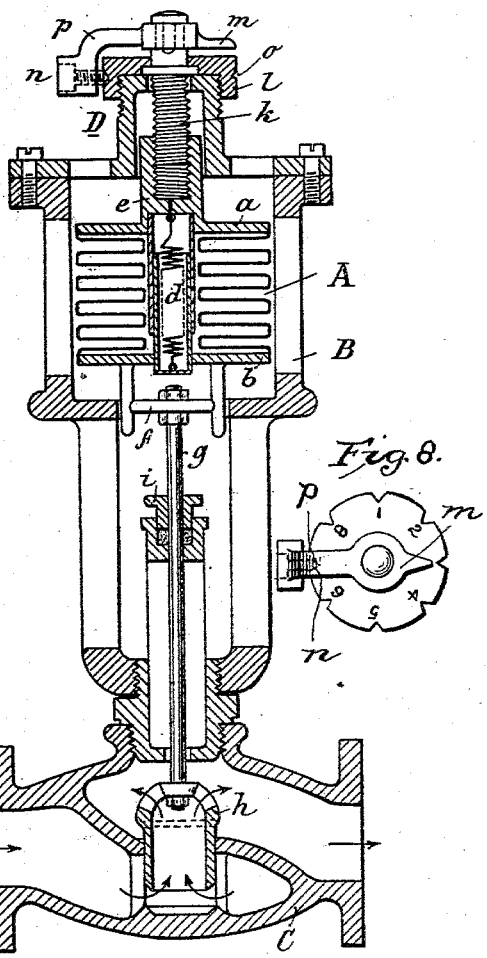
Figure 8:
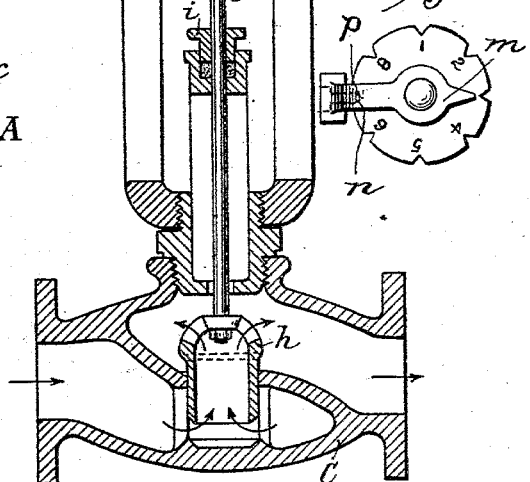

In the annexed drawings, Figure 1, shows a longitudinal section of the expansible cell out of action or contracted. Fig. 2, shows the same when in action or expanded. Fig. 3, is a view of a modification. Fig. 4, as well as Figs. 5 and 6 shows the arrangement of the expanding body as a heat regulator the same being connected with the valve for the shutting off of the heating fluid medium. Fig. 7, shows an expanding body provided with a rod which may be connected with any suitable valve or other device, as for instance air valves used in hot air heating, or throttle valves when used in steam heating. Fig. 8 is a plan view of the index and dial.

The expanding body or cell consists of two stiff plates or pieces $a, b$ connected by a flexible corrugated or accordion shaped diaphragm $c$ in the interior of which a spring $d$ is located which serves to contract the diaphragm $c$ when out of action. In the space formed by the plates $a, b$ and the diaphragm $c$, a fluid is introduced, for instance ether, that works by expansion. The plates $a, b$, can, as shown, be connected by a diaphragm provided with cross folds or divisions of any desired number; but I do not wish to limit myself to this form of diaphragm. The casing consists preferably of two cylinders fitting the one into the other so as to slide, in order that the one movement of the plate $a$ or $b$ that transmits the action of the diaphragm be not prevented.

In certain cases it may be important that the sliding rod as $g$, Figs. 5, 6 and 7, used for transmitting the motion produced by expansion or contraction, passes through the expanding body A. In order to allow this I may use an expanding body as shown in Fig. 3. In this case the cell is of annular form and receives the fluid in its annular space. The outer and inner walls $c\ c'$ are provided with cross folds, as in Figs. 1 and 2, so that by the movement of these folds the desired effect will be obtained by the to and fro motion of either plate $a$, or $b$ of the expanding body.

In order to illustrate the working of the present invention, the expanding body is shown in Figs. 4, 5 and 6, connected with a stop valve. In this case the expanding body A is inclosed in a casing B which carries the stop valve box C at its lower end, while the upper extremity is provided with a cap D which carries devices serving to adjust the cell with its valve. The parts $a, b$ are provided respectively with extensions $e, f$ of which the former serves for adjusting the position of the cell and valve and the latter serves for guiding the plate $b$ when it slides up and down and for connecting the sliding rod $g$ to the plate $b$. The sliding rod $g$ is connected with a double seat valve $h$ which for the purpose has the shape of a cylinder in order to present as small a surface as possible to the pressure of the liquid. The guiding of the sliding rod $g$ is effected by a stuffing box $i$.

For obtaining the desired adjustment the cap D at the top of the casing B supports a screw $k$ engaging the extension $e$ of the expanding body which screw is held in position by a covering nut $l$, and can be turned to the position required for the desired effect by means of a lever $p$, provided with an indicator $m$, which lever when turned to any position can be fixed by a screw $n$ entering one of the recesses $o$ around the nut $l$. If the screw $k$ is turned to the right the expanding body A is lifted and the closing of the valve will take place at a later moment, corresponding to the longer distance it has to travel. By turning to the left the expanding body with the valve is lowered and the closing of the valve will occur sooner according to the amount the cell has been adjusted down.

The operation is illustrated by Figs. 4 to 6. In Fig 4, the expanding body A is supposed to be contracted and the valve $h$ to be open. In Fig. 5, the expanding body is raised by the means of the adjusting devices and consequently the valve is still more open. In Fig. 6 the body A is expanded in consequence of which the sliding rod $g$ is pushed downward by the plate $b$ and the valve $h$ is closed. For the perfect operation of the expanding body the valve $h$ must be arranged to receive little or no pressure from the liquid being controlled so that the expanding body will only have to work against the weight of the valve and the friction of the same and that of the valve rod at the box $i$. The valve is therefore made hollow and cylindrical.

In Fig. 7, the expanding body A is also inclosed in a casing B, and the movable plate $b$ is connected with a sliding rod $g$. The sliding rod $g$ is guided in an eye $q$ similar to the stuffing box $i$, in Figs. 4 to 6. In this case the sliding rod $g$ can be attached to any mechanism required for the desired object.

While I have shown a spring tending to draw the two plates together, I do not wish to limit myself to this use of the spring.

I claim—

1. In combination, the valve or like device, and the expansible cell connected therewith comprising the plates $a$, $b$ one of which is movable, the flexible connection between the plates forming a space to contain the expansible fluid and the spring within the cell to act on the two plates, each of said plates having a tubular part, which slide one within the other and inclose the spring, substantially as described.

2. In combination, the valve, the cell, the supporting casing including the cap D, the screw extending through said cap and engaging a boss $e$ on the cell, the nut $l$ for holding the screw in place, the lever carrying a pointer and the means for fixing the lever with its screw in any desired position, substantially as described.

In witness whereof I have hereunto set my hand in presence of two witnesses.

EMIL HEINRICH CONRAD OEHLMANN.

Witnesses:
GUSTAV WILLNER,
E. K. EBERTLY.